July 2, 1940.　　　　　H. F. HAGEMEYER　　　　　2,206,459
MOLD EXTRACTOR CONTROL
Filed Oct. 26, 1938　　　　　3 Sheets-Sheet 3

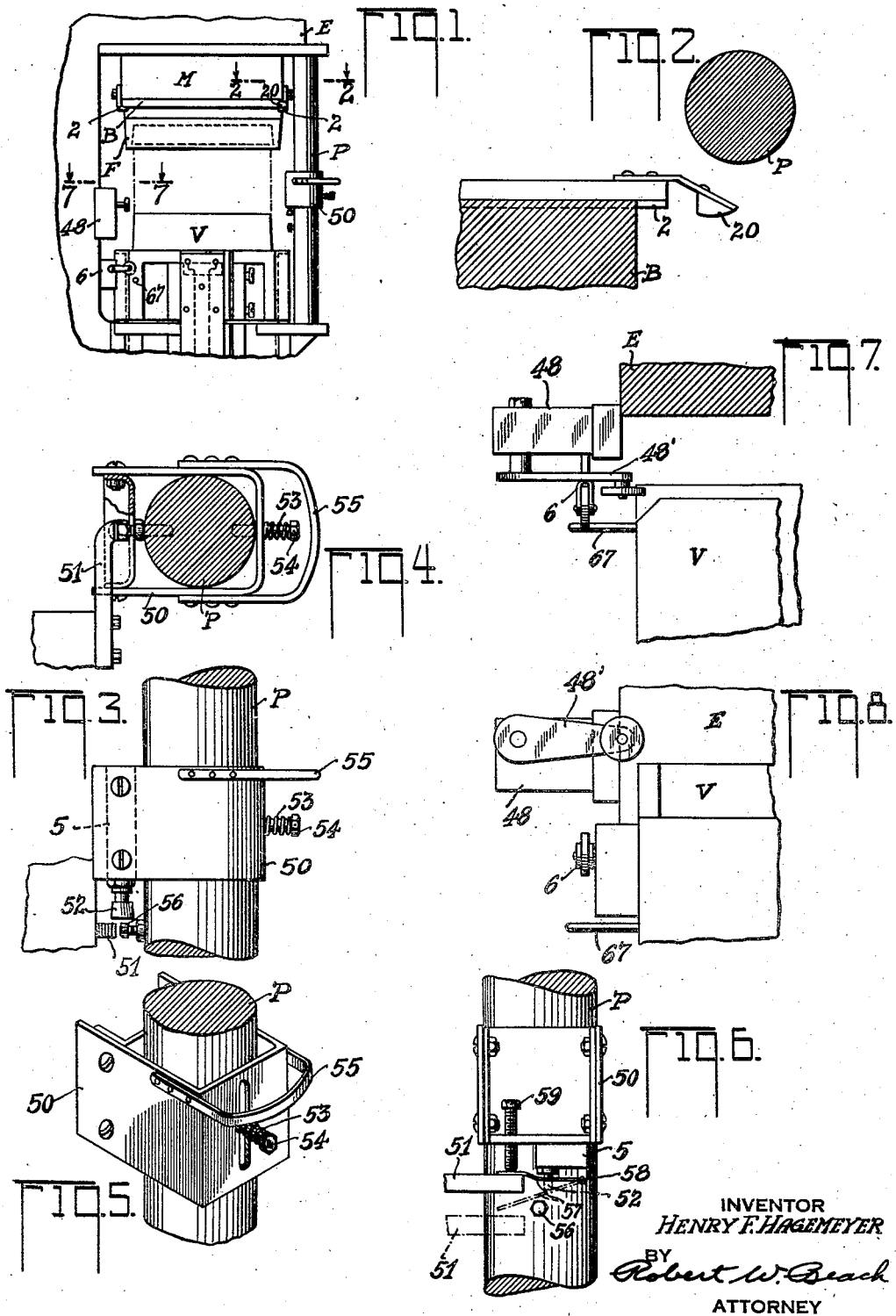

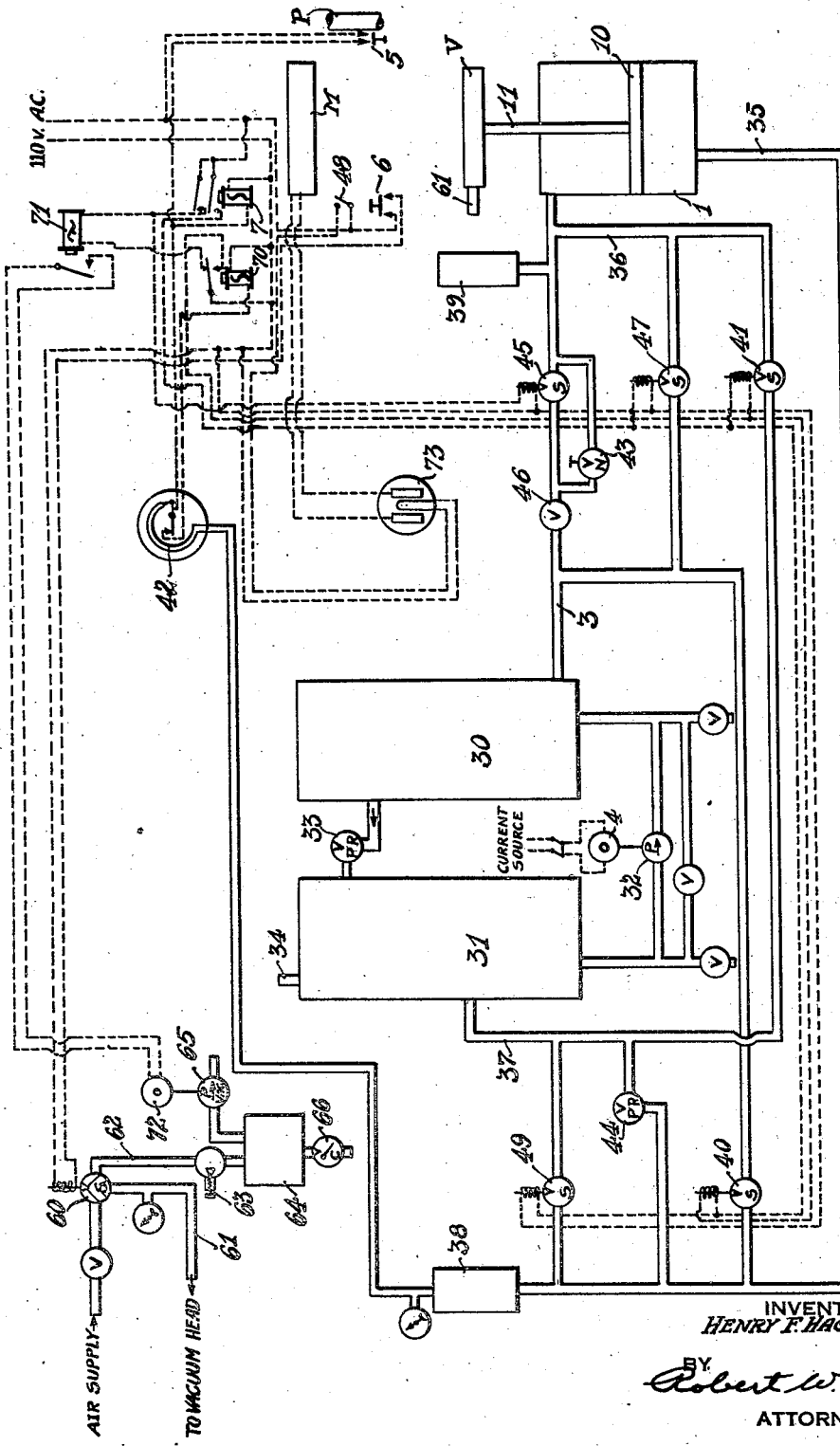

INVENTOR
HENRY F. HAGEMEYER
BY
Robert W. Beach
ATTORNEY

Patented July 2, 1940

2,206,459

UNITED STATES PATENT OFFICE 2,206,459

MOLD EXTRACTOR CONTROL

Henry F. Hagemeyer, Chicago, Ill., assignor to Castings Patent Corporation, a corporation of Illinois Application October 26, 1938, Serial No. 237,018

15 Claims. (Cl. 22—47)

My invention pertains to automatic control mechanism for mold extractors such, for example, as that disclosed in my application Ser. No. 213,165 filed June 11, 1938, entitled Mold extractors, or in my Re. Patent 21,046 issued April 11, 1939, for Apparatus for producing molds.

Such mold extractors ordinarily include two gripping or holding heads, one of which is reciprocable toward and away from the other. Such heads may be, for example, a magnetic head to hold an iron matchplate or mold form, and a vacuum head to engage a surface of a mold, which latter may be of the gypsum base type.

In the operation of such an extractor it is necessary to energize the magnetic chuck, which may be either of the permanent magnet type or electromagnetic, to produce a vacuum between the vacuum head and mold surface engaged thereby, to effect approach or closing movement of the heads, and to separate the mold from the matchplate or mold form by separating movement of the heads. Ordinarily these operations would be carried out by the use of manual controls, but I have devised mechanism whereby the complete operating cycle may be controlled automatically, it merely being necessary to initiate operation of the control mechanism manually.

A typical example of an automatic operating cycle may include effecting approach of the vacuum and magnetic heads, during such approach movement energizing the magnetic head, at the end of such approach movement evacuating the vacuum head to grip the engaged mold surface, delaying separating movement of the heads until a proper seal has been effected between the vacuum head and mold surface and a vacuum has been established therebetween, following such delay by a slow speed separating movement of the heads which continues until after the mold has been broken loose from the mold form, if desired discontinuing the evacuating action of the vacuum head or the gripping action of the magnetic chuck or both, and following the slow separating movement of the two heads by a faster separating movement. Obviously the points in the operation at which the magnetic chuck and the vacuum head are energized and deenergized will differ according to the mechanical arrangement of the extractor parts. For example, the vacuum head may be reciprocable and face upward while the magnetic chuck may be stationary and would face downward, which is the preferred arrangement. After the mold has been broken loose from the mold form, therefore, it will rest on the vacuum head so that the vacuum may be discontinued at any time. No additional mold support need be provided to receive the mold when the suction stops, as would be necessary with a downwardly facing, lifting vacuum head. If the magnetic chuck is deenergized, however, supplemental mold form supporting means must be provided, or else the mold form must be supported by the operator when the magnetic chuck releases it.

The positions of the heads may be reversed, if desired, the vacuum or mold supporting head being on top and facing downward while the magnetic chuck will be beneath the mold supporting head and face upward. In this case when the vacuum head releases the mold it must either be supported by the operator or by a supplemental support, whereas the magnetic chuck may be deenergized and the mold form will still be supported thereby. Not only may the positions of the mold supporting and mold form supporting heads be reversed as described, but either the upper or the lower head may be movable and the other stationary, or both may be movable. Moreover it is not necessary that the heads be disposed in a horizontal position, for they may be mounted on edge. Also instead of having a linear movement they may swing toward and away from each other about a fixed axis, one or both thereof moving along an arcuate path. Holding means other than a magnetic chuck and a vacuum head may be employed which may involve different types of energizing and control mechanism. In all these installations, however, certain fundamental requirements must be observed. The two heads, one to grip the mold and the other to grip the mold form, must approach each other, break the bond between the mold and mold form, and then separate.

The principal object of my invention is to accomplish automatically the movement and operations necessary to form a complete mold extracting cycle.

More specifically it is an object to accomplish automatic approach of mold form holding means and mold holding means, to engage both of such means respectively with a mold form and a mold contained therein, and thereafter to effect separation of such two means to remove the mold from the mold form.

An incidental object is to provide a delayed action operation between the approach of the two holding means and the initiation of their separating movement, to enable such holding means to obtain a firm grip upon the mold and mold form prior to such separation.

A further object is to effect slow movement over the first part of the mold and mold form separating travel to enable the bond between the mold and mold form to be broken without violence, thus to prevent injury to the fragile mold.

It is also preferred to provide a vacuum head for gripping the mold and a magnetic chuck for gripping the mold form so that an even distribution of the holding action over substantially the whole surface of each head will be accomplished.

Another object is to provide such features in an automatic control the mechanism of which is dependable, yet which will afford the requisite precision of operation.

As has been pointed out, the control mechanism must be sufficiently flexible to be adapted by one skilled in the art to various types of mold extractors and similar machines. I have illustrated in the drawings, therefore, an exemplary control system the operative principles of which may be adapted to various types of extractor and to afford operations which differ in minor particulars. The novel features of my control system are defined in the claims.

Fig. 1 is a fragmentary side elevation view of an extractor to which my automatic control may be adapted.

Fig. 2 is a fragmentary transverse section taken on line 2—2 of Fig. 1 illustrating stop mechanism for positioning a mold form.

Fig. 3 is a side elevation view of the control block.

Fig. 4 is a bottom plan view of the control block of Fig. 3.

Fig. 5 is a top perspective view of the control block shown in Figs. 3 and 4.

Fig. 6 is a rear elevation view of a modified control block switch arrangement.

Fig. 7 is a fragmentary plan view taken on line 7—7 of Fig. 1 showing the positioning of control switches engaged by a reciprocable head.

Fig. 8 is a fragmentary side elevation view of the control switch arrangement of Fig. 7.

Fig. 9 is a representative control system electrical circuit and piping diagram.

In my application Ser. No. 213,165, referred to above, it has been pointed out that an accurate guide mechanism must be provided for the reciprocating head. Preferably the mold gripping head and the mold form gripping head have relative linear movement, for often attached cores project into the matchplate beyond the general parting surface of the mold section. Any tilting movement or weaving of the movable head and mold will cause binding, and lateral stress will be exerted on such attached cores which will break them off. Even where precisely linear movement is accomplished there must be no sudden jerk, for such unevenness of movement sometimes causes the mold cores to break off although started from the pattern. These considerations apply whether the mold be of the gypsum base type or be made of sand or other fragile material.

My control mechanism has therefore been designed particularly for extracting from a mold form a fragile mold without subjecting it to any shock, while at the same time performing the extracting operation entirely automatically. The designation mold form includes any pattern, matchplate, or other form, but that illustrated is an integral matchplate and upstanding flask rim. The proper guiding operation must, of course, be accomplished by the structure of the machine apart from the automatic control mechanism. When a gripping arrangement other than a positive mechanical holder is employed, such as a magnetic chuck or vacuum head, a firm engagement of the part to be gripped thereby must be accomplished, and a sufficient time delay be provided to enable a proper grip to be effected. In order to prevent fracture of the mold by too violent an operation in separating it from the mold form, a very slow feed should be provided at the initiation of the separating movement of the heads, which later may be converted into a fast feed. An intermediate speed between the slow and fast speeds may also be utilized, if desired. Change from the slow to the next faster feed should not be accompanied by a jerk, for the time of change will occur before the mold cores have been fully withdrawn from the pattern and hence they may be broken off.

Figure 11:
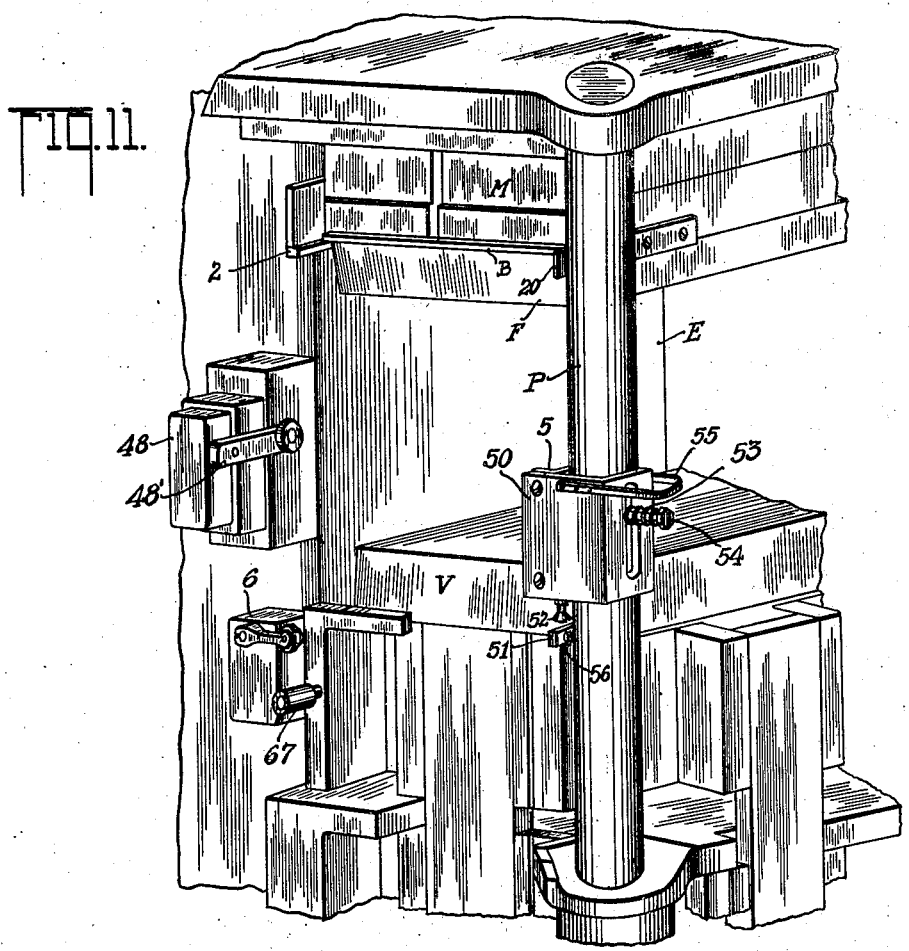
Fig. 11 is a perspective view of the extractor showing the switches mounted thereon.

I have illustrated mechanism which may be effectively employed to produce an automatic controlling operation for an extractor which will operate in the manner discussed. As adapted to an extractor of the type shown in Figs. 1 and 11, indicated at E, the control mechanism may include a hydraulic operating system coupled with an electric control shown diagrammatically in Fig. 9. In this particular form the extractor has a magnetic chuck M adapted to grip the mold form and a vacuum head V which will grip a surface of the mold. While any reciprocating mechanism may be employed a hydraulic cylinder I in which a piston 10 reciprocates is suitable. This piston carries a piston rod 11 which is connected to the vacuum head V. The magnetic chuck M mounted above the vacuum head is stationary and is provided with guide ways or flanges 2 to receive a base plate B of a mold form or flask F as shown in Figs. 1, 2 and 11. At the end of one of the ways is secured a spring stop 20 which projects beyond the guiding surface of the ways sufficiently to engage the end of the base plate to stop it in the proper position with relation to head V for extraction of the mold. The plunger of an electric solenoid or any suitable mechanical stop may be substituted for the mechanism illustrated. With the flask or mold form F thus positioned in registry with the vacuum head V fluid may be admitted into the lower end of the cylinder I to raise the piston 10, and thus to engage the vacuum head with the exposed surface of the mold in the mold form F. While either liquid or gas may constitute the operating fluid, the former is preferable, light oil operating satisfactorily.

The fluid entering the cylinder should be under sufficient pressure to force the vacuum head firmly against the mold so that it will seat thereon in air-tight contact. The vacuum head and the magnetic chuck, if not energized previously, should now be energized while the vacuum head is pressed against the mold, and the base plate B is in turn pressed against the magnetic chuck M. After a vacuum has been established between the vacuum head and the mold surface the two heads may be separated to break the mold loose from the mold form. The initial separating movement should be very steady and at a slow rate so that the fragile mold is not subjected to shock. When the bond is broken the separating movement should continue at a fairly slow rate until the mold is well clear of the flask, whereupon the remainder of the movement may be at a comparatively rapid rate.

Where a vacuum head is used to withdraw a gypsum base mold from a mold form, the mold, which contains considerable chemically uncombined water, should not be subjected to any greater suction or for any longer than is absolutely necessary, for the removal of water from the mold occasioned thereby tends to distort the mold cavity, particularly in a direction perpendicular to the parting surface of the mold and the vacuum head. My control mechanism is therefore adapted, where a vacuum head is employed, to evacuate it as late as possible in the operating cycle and to terminate the evacuation almost as soon as the mold is started from the mold form.

A typical automatic control arrangement is illustrated in Fig. 9. A liquid under pressure, supplied to cylinder 1 through conduit 3, is stored in a tank 30, being forced thereinto from a supply tank 31 by a pump 32. A pressure relief valve 33 in a bypass from tank 30 to tank 31 insures that the pressure in tank 30 will remain constant. The motor 4 which drives pump 32 may be either continuously operable, manually operable, or automatically operable, to maintain the pressure of the tank within the limits of a desired pressure differential. Tank 31 is always under atmospheric pressure being vented at 34. A valved conduit connecting the two tanks for the purpose of equalizing the liquid level therein, and a drain for each tank, should be provided as shown.

From the tank 30 fluid under pressure is supplied to the pressure conduit 3 which may be placed in communication with conduit 35 to admit fluid to the lower end of cylinder 1. Solenoid valve 40 of the normally closed type controls the flow from pipe 3 to pipe 35. The solenoid of this valve must therefore be energized in order to initiate upward movement of the piston 10 in the cylinder 1. During such upward movement the normally closed solenoid valve 41, controlling communication between conduits 36 and 37, is also energized for discharge of fluid from the upper end of cylinder 1 into supply tank 31.

When the head V is pressed firmly against the mold and is in sealing engagement therewith piston 10 will cease its upward movement and the liquid pressure will build up in the lower end of cylinder 1, conduit 35 and air or gas dome 38. Any gas, of course, will act as a compressible medium in the dome to retard the increase of liquid pressure. When the pressure has built up to a predetermined value the pressure operated switch 42 will be broken, preferably being actuated by a Bourdon tube mechanism. The breaking of this switch will de-energize solenoids 40 and 41, as will be explained hereafter, to prevent a further increase of pressure in the air dome 38 and to shut the exhaust connection with the upper end of cylinder 1 preparatory to initiation of separating movement of the two heads.

After the piston reaches the end of its outward movement, wherein the vacuum head moved thereby is pressed tightly against the exposed surface of the mold, there will be a short delay prior to initiation of the separating movement to enable the vacuum to build up in head V to afford a firm suction grip on the mold. This delayed action is accomplished by an air or gas dome 39 which decreases the rate of pressure increase in conduit 36 to a value sufficient to overcome the pressure in the lower end of cylinder 1 and to force the piston 10 downward. The pressure required is considerable, for it will be noted that while solenoid valve 40 was deenergized by pressure of the vacuum head against the mold surface, thus closing communication between the lower cylinder end and the pressure liquid source, no other conduit communicating with such end had been opened. A quantity of incompressible liquid is therefore sealed in the lower portion of cylinder 1 and conduit 35, further compression of the gas in dome 38 affording slight relief.

Piston 10 will not move downward, therefore, despite closing of valve 41 and supply of liquid under pressure through 43 until an escape for the liquid from beneath the piston has been afforded. For this purpose a pressure relief valve 44 is provided in a bypass between conduit 35 and exhaust conduit 37, which will be opened when the liquid in the lower end of cylinder 1 is subjected to a predetermined pressure by the liquid above piston 10 exerting a slightly higher pressure thereon. Obviously, in order for the pressure controlled switch 42 to break, its operating pressure must be lower than that for which valve 44 is set, or otherwise as the pressure builds up in conduit 35 at the end of the head's upward movement liquid would be bypassed to exhaust conduit 37 through valve 44 and the pressure never could reach that required to actuate switch 42. It is preferred that the pressure in the lower end of cylinder 1 be not relieved at the end of the piston's outward stroke but that at least the first part of the inward movement take place against such pressure. Relief of this liquid pressure tends to cause a settling of the piston which affords too violent a jerk of the vacuum head and mold. This is especially pronounced when the pressure is relieved after pressure has been built up on the upper side of the piston.

A further factor contributing to the delay in initiation of separating movement of the heads is the utilization of a small metering orifice, either of fixed size or variable as afforded by a needle valve 43, greatly restricting initial flow of liquid from pressure conduit 3 into conduit 36. Immediately after valve 41 has closed the only communication with conduit 36 is afforded through this restriction. The further and primary function of this metering orifice is to afford very slow downward movement of the vacuum head initially, particularly while the mold is being broken loose from the mold form. Such slow movement coupled with a gradual increase in stress corresponding to the gradual pressure increase in the upper end of the cylinder provides a very gentle breaking of the bond between the mold and mold form.

After the piston has moved down a very small distance to break the mold loose from the mold form, which travel may be for various installations from a few thousandths to an eighth of an inch or so, the normally open solenoid valve 45 is deenergized, which permits communication from conduit 3 to conduit 36 around needle valve 43. There are now two supplementary communicating passages open between the pressure conduit and conduit 36, one through the needle valve and the other through solenoid valve 45. A further control valve 46, such as one of the gate type, common to both these passages may control the aggregate flow through them, which in turn will control the speed of separating movement after valve 45 opens. This affords a controlled intermediate speed which may persist until the mold is well clear of the mold form.

As the heads separate to a point where the mold is entirely free from the flask or mold form, the solenoid valve 47 of the normally open type may be deenergized by breaking of the limit switch 48, which will connect the entire flow volume of conduit 3 with conduit 36 through all three passages to expedite further the speed of separating movement of the two heads. Not only is the solenoid valve 47 opened by breaking of switch 48 but solenoid valve 49 is also deenergized thereby and moves to the open position, which relieves the pressure in the lower end of cylinder 1 and in conduit 35 by establishing free communication between the latter and conduit 37 connected to supply tank 31. Prior to opening of valve 49 a fairly high pressure, preferably about 45 pounds, has been maintained in conduit 35 despite downward movement of piston 10, by bypassing fluid through pressure relief valve 44 from conduit 35 to conduit 37 as previously explained. Valve 44 may, of course, be set to maintain in conduit 35 during such movement any pressure less than that in conduit 3, desired. The maintenance of such pressure in the lower end of cylinder 1 holds the vacuum head up at the end of its upward movement until pressure has been built up in the upper end of cylinder 1 as described heretofore, thus affording the desired time delay during which the vacuum is built up between the vacuum head and the mold surface, and preventing any sudden settling of the piston 10 until after the mold is well clear of the mold form, such as at the time switch 48 breaks. A settling action will occur at this point as valve 49 opens, but it will not injure the mold which is then entirely freed from the mold form. All the solenoid valves of the control mechanism have now been deenergized, leaving all the pressure fluid passages to the upper end of cylinder 1 open and its exhaust valve closed, while the lower cylinder end exhaust valve is open and its pressure valve is closed. Piston 10 will therefore complete its movement to its lowest position and be held in such position until another operating cycle is initiated.

As pointed out, the preferred operation effects deenergization of valve 45, which is of the normally open type, after the piston 10 has moved downward only a very short distance from its uppermost position, somewhere between a few thousandths and about an eighth of an inch, depending upon the characteristics of the mold being withdrawn from the mold form and other considerations of each particular installation. Breaking of the solenoid circuit may be effected by means of a switch 5 of the normally open push button type carried by a block 50 (see Figs. 3, 4 and 5) slidable upon a post P, which may be part of the extractor proper or may be supplied only for this purpose. Within the term normally open push button type switch I include any which by movement of an engaging member in a direction away from the switch will be operated to break the solenoid circuit. Switch 5 will be selected according to the travel of the head desired before breaking of the switch. The block 50 will be slid upward along post P by a switch engaging member 51, carried by the vacuum head V or some part moving therewith, by engagement of such member with a switch operating member 52 which will hold the switch in the contacting position during its upward movement. Some friction mechanism or equivalent holding means such as a spring 53 surrounding a bolt 54 secured upon the post P should be provided to hold the block stationary relative to the post under the force of gravity acting thereon. When the member 51 starts to move downward away from the switch as the separating movement of the heads is initiated, the switch operating member 52 is gradually released until the switch breaks contact, at which time the solenoid valve 45 will be deenergized by breaking of its circuit. The switch 5 may be closed by the reciprocating member 51 moving up against it, but it is preferable to effect closing of this switch to initiate operation of the entire control mechanism by manually sliding the block downward by grasping a handle 55 until the member 52 engages a fixed stop 56 which may be secured to the post 50. This mechanism also serves as a safety switch, for if it is raised either from stop 56 or from member 51 during upward movement of the head circuits of solenoid valves 40, 41 and 45 at least will be deenergized so that the head will immediately stop and then move downward to its lowest position.

Since it is desirable to maintain evacuation of the vacuum head for the least possible length of time, breaking of the control switch 5 may also be used to terminate its evacuation. Before the head reaches the bottom of its travel the mold should be freed from it by supplying air under pressure to the head to raise the mold slightly therefrom. This operation may be accomplished by a momentary contact switch 6 which will operate a three way air solenoid valve 60 to supply compressed air to the head. The switch should make contact by movement in only one direction so that valve 60 will not be moved when the vacuum head moves upward. The air may be supplied to the head V through the same conduit 61 as that by which the head is evacuated, as shown, or through separate pipes, the vacuum conduit 62 being closed when the air supply conduit is open. This reversal of head connection from the vacuum conduit to the air supply conduit will be effected only during energization of valve 60, the head conduit normally being in communication with the vacuum conduit 62. A vacuum control valve 63 which may be adjusted to bypass air into the vacuum conduit after a certain vacuum has been attained should be provided, for beside maintaining the vacuum for the least possible time it is also desirable to utilize minimum amount of vacuum. A water trap 64 should also be included in conduit 62 to remove moisture sucked from the mold, which otherwise would be passed on into the vacuum pump 65. A drain including a check valve 66 will remove the water from the tank or trap 64. Duration of the evacuation may be controlled by starting and stopping the pump 65, which is effected by the circuit shown, or by employing a further normally closed solenoid valve in conduit 62 which will be energized to evacuate the head V.

The switches 6 and 48 may be mounted on the frame of the extractor as shown in Figs. 7, 8 and 11, if desired, being positioned adjacent to the path of movement of the reciprocating head to be engaged by parts of the extractor moving in conjunction with such head. A roller arm of switch 6 may be positioned to engage a pin 67 projecting laterally from the vacuum head. A roller mounted on a swingable arm 48' of switch 48 may engage the side of the vacuum head to close the switch as the head moves up, and to release it as the head moves downward below the switch for breaking the circuit. Altering the vertical positions of these switches will, of course, vary the times at which they are operated.

Figure 10:
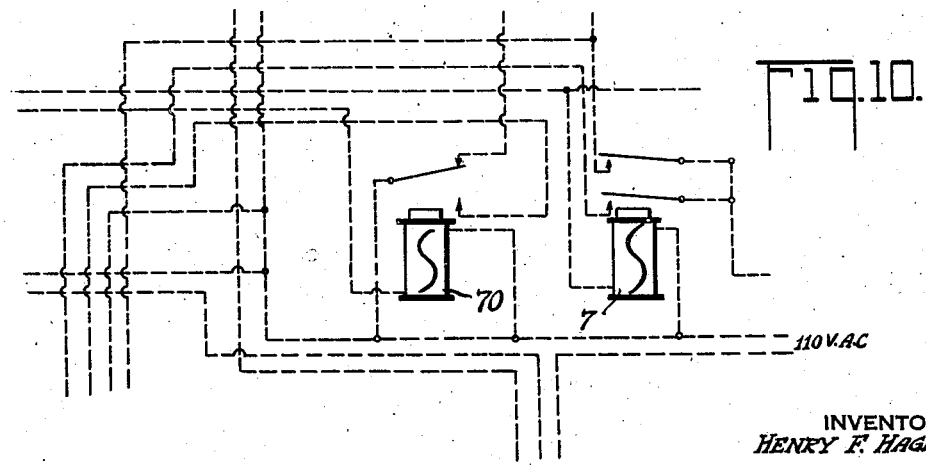
Fig. 10 is a diagram showing that section of the wiring in the upper, right portion of Fig. 9 on an enlarged scale.

I have now described the operation of the machine and the function and general nature of the several elements of the mechanism in a practical form. The electrical control circuit illustrated in Figs. 9 and 10 is an exemplary wiring diagram which may be employed to connect these various elements together to obtain the desired operation. It will be appreciated, however, that the wiring may vary considerably according to the desires of one skilled in the art and still obtain substantially the same operation by employing equivalent mechanical elements. In the diagram illustrated, a 110 volt alternating current supply is employed in conjunction with a master relay 7 and a secondary relay 70, the latter being primarily dependent upon operation of the pressure controlled switch 42. A third relay 71 may be provided to operate a magnetic switch for energizing motor 72 which drives the vacuum pump 65.

Such an arrangement will cause the motor to start when the vacuum head is to be evacuated and to be stopped when the evacuation is to be terminated. As previously suggested, an alternative construction may include a continuously operating motor, or one controlled other than automatically, and an additional normally closed solenoid valve in vacuum conduit 62. Such solenoid valve would be operated by relay 71 instead of the motor 72 being operated thereby.

With the wiring arrangement illustrated the operation of my automatic system will be initiated by pushing sliding block 50 downward until switch operating member 52 is pressed against stop 56 which effects closing of switch 5. Relay 7 will thereby be energized, and since switch 42 is not under pressure and hence will be closed relay 70 likewise will be energized. The armature contacts closed thereby will energize the solenoid valves 40, 41, 45, 47 and 49 and the electromagnetic chuck M, to which current is supplied from a rectifier 73, but the vacuum motor 72 will not be started. The circuit may be altered to delay energization of the magnetic chuck until near the end of the head's approach movement if desired. With the solenoid valves energized, liquid under pressure will be supplied to the lower end of cylinder 1 and the upper end of this cylinder will be connected to the exhaust conduit 37 so that the vacuum head V will be raised. During this upward movement switch engaging member 51 will engage switch operating member 52 when it is in switch-closed position and will raise it from stop 56 while still holding the switch in closed position, sliding block 50 upward along post P. When the head reaches its uppermost position and stops, the pressure will increase in conduit 35, which in turn will raise the pressure of the gas in dome 38 and in the Bourdon tube of switch 42 to cause this switch to break.

When pressure controlled switch 42 breaks, relay 70 is deenergized although relay 7 remains energized. Deenergization of relay 70 starts the vacuum pump motor 72 by a circuit through a normally closed armature contact of relay 70 and a normally open armature circuit of relay 7 which is still being held in the contacting position. Also solenoid valves 40 and 41 will be deenergized thereby and will close. There will be no movement downward of the vacuum head V, which will be held in its upper position by the liquid now sealed in the lower end of cylinder 1 and in conduit 35, until after an increase in pressure, predetermined by the setting of pressure relief valve 44, has been established in the upper end of the cylinder. Initially pressure liquid will only be supplied through the metering orifice 43, and the pressure in the upper end of the cylinder will increase gradually because of the action of air dome 39 retarding such increase. When the pressure has finally reached a value which will force piston 10 downward and cause liquid to flow from conduit 35 through valve 44 into conduit 37, the vacuum head V will commence its downward movement to break the bond between the mold and mold form. This will be accomplished, as previously stated, after very slight separating movement of the two heads. At the end of a small predetermined movement switch engaging member 51 will have receded from switch operating member 52 a distance sufficient to release switch 5 for breaking, the switch operating member being now well above stop 56 and the switch no longer being held in the closed position by engagement therewith, which will effect deenergization of master relay 7.

Breaking of the armature circuits of relay 7 will in turn cause deenergization of solenoid valve 45 and relay 71 controlling vacuum motor 72, so that simultaneously a greater flow of pressure liquid will be admitted to the upper end of cylinder 1 and the evacuation of vacuum head V will be terminated. It will be noted that the liquid in the lower end of cylinder 1 and in conduit 35 will still remain under pressure, but because of the increase in rate of supply of pressure fluid to the upper end of the cylinder the speed at which the heads separate will be increased to intermediate speed. This operation continues until the head V has descended far enough to allow limit switch 48 to break, which will deenergize rectifier 73, and hence the magnetic chuck M, as well as solenoid valves 47 and 49. The mold form will now be supported only along its edges by the flanged guides or ways 2 shown in Fig. 1. Deenergization of these solenoid valves, allowing them both to open, will effect fast downward movement of the head V since valve 47 allows unrestricted flow of pressure liquid to the upper end of cylinder 1 and opening of valve 49 effects communication of conduit 35 with conduit 37 to relieve the pressure in the lower end of the cylinder. All the solenoids have now been deenergized as well as the magnetic chuck and vacuum head. The piston 10 will continue its downward movement until it reaches its limiting position.

During the latter part of the head's downward travel switch 6 will be momentarily closed which will reverse three-way valve 60 to supply air under pressure to such head. This will lift the mold slightly to prevent its sticking to the head and to enable it to be removed easily by the operator.

At the completion of this cycle of operations switch 5 will remain in the open position and sliding block 50 will be held in the raised position to which it was moved by upward movement of member 51. In order to again initiate operation of the control mechanism for another operating cycle it is merely necessary to slide block 50 down post P until switch 5 is again closed by engagement of member 52 with stop 56.

In Fig. 6 is shown a modified form of push button switch arrangement to enable adjustment of the amount of separating movement of the heads which will cause breaking of switch 5. In this variation, to the switch operating member 52 of Figs. 3, 4 and 5 is attached a spring or flexible leaf 57 pivoted on sliding block 50 at 58. Its other end engages a vertically adjustable limit stop screw 59 as it is pushed upward by switch engaging member 51. After the switch is closed further pressure on the free end of spring leaf 57 will merely flex it until it engages stop screw 59 in the position in which it is set. As member 51 recedes from block 50 leaf 57 will first unbend, and as it approaches the broken line position shown switch 5 will break. Almost immediately thereafter member 51 will leave leaf 57, as shown in broken lines. Obviously the farther down screw 59 projects the smaller will be the travel of head V before switch 5 breaks. Stop 56 is positioned to engage member 57 opposite switch operating member 52 the same as in the form of Figs. 3, 4 and 5.

As my invention I claim:

1. In a mold extractor, a head movable to extract a mold from a pattern, a piston rod connected to said head, a piston carried by said rod, a fluid cylinder receiving said piston, fluid supply means connected to said cylinder for forcing said piston and rod outward, fluid supply means connected to said cylinder for forcing said piston and rod inward in the mold extracting direction, control means actuated by the increased pressure in said first fluid supply means at the end of the piston's outward movement for initiating operation of said second fluid supply means, and means operable to retard the rate of pressure increase in said first fluid supply means at the end of said piston's outward movement.

2. In a mold extractor, a head movable to extract a mold from a pattern, a piston rod connected to said head, a piston carried by said rod, a liquid filled cylinder receiving said piston, means connected to said cylinder for supplying liquid under pressure thereto to force said piston and rod outward, means connected to said cylinder for supplying liquid under pressure thereto to force said piston and rod inward in the mold extracting direction, control means actuated by the increased pressure in said first liquid supply means at the end of the piston's outward movement for initiating operation of said second liquid supply means, and a gas dome communicating with said control means, containing gas compressible by liquid from said first liquid supply means, for retarding the rate of pressure increase in such means to pressure sufficient to operate said control means.

3. In a mold extractor, a head movable to extract a mold from a pattern, a piston rod connected to said head, a piston carried by said rod, a fluid cylinder receiving said piston, fluid supply means connected to said cylinder for forcing said piston and rod outward, fluid supply means connected to said cylinder for forcing said piston and rod inward in the mold extracting direction, control means actuated automatically at the end of the piston's outward movement for initiating operation of said second fluid supply means, and means for retarding the rate of pressure increase to operative pressure in said second fluid supply means after initiation of its operation by said control means.

4. In a mold extractor, a head movable to extract a mold from a pattern, a piston rod connected to said head, a piston carried by said rod, a liquid-filled cylinder receiving said piston, means connected to said cylinder for supplying liquid under pressure thereto to force said piston and rod outward, means connected to said cylinder for supplying liquid under pressure thereto to force said piston and rod inward in the mold extracting direction, valve means actuated automatically at the end of the piston's outward movement for initiating operation of said second liquid supply means, and a gas dome communicating with said second liquid supply means between said valve means and said cylinder, containing gas compressible by liquid from said second liquid supply means, for retarding the rate of pressure increase in such means to pressure sufficient to move said piston after initiation of its operation, and thereby delaying initiation of inward movement of said piston and rod.

5. In a mold extractor, a head movable to extract a mold from a pattern, a piston rod connected to said head, a piston carried by said rod, a fluid cylinder receiving said piston, fluid supply means connected to said cylinder for forcing said piston and rod outward, fluid supply means connected to said cylinder for forcing said piston and rod inward in the mold extracting direction, a metering orifice for limiting the rate of flow through said second fluid supply means at the initiation of its operation, an air dome for delaying the rate of pressure increase in said second fluid supply means to pressure sufficient to move said piston after initiation of its operation, and means operable automatically to by-pass said metering orifice to give substantially unrestricted flow through said second fluid supply means by partial inward movement of said piston rod.

6. Automatic control mechanism for a reciprocating gripping head, comprising means operable to move the head in one direction into gripping position, and to return it in the opposite direction, delayed action means operable to postpone, for a predetermined time interval, initiation of movement of the head in such opposite direction, and means operated by movement of said head into gripping position to effect gripping operation of the head while said delayed action means is in operation.

7. Automatic control mechanism for a reciprocating, vacuum, mold gripping head, comprising means operable to move the head in one direction into gripping position, and to return it in the opposite direction, and evacuating means energized to withdraw air from the head by movement of said head into mold gripping position, thus to effect a suction grip on the surface of the mold engaged by the head.

8. Automatic control mechanism for a reciprocating vacuum mold gripping head, comprising means operable to move the head in one direction into mold engaging position, evacuating means for the head energized by engagement of the head with a mold disposed in mold engaging position, said first means being further operable to return the head in the opposite direction, and delayed action means operable to postpone initiation of movement of the head in such opposite direction until after a firm suction grip on the engaged surface of the mold has been effected by the vacuum head.

9. A mold extractor, comprising a magnetic chuck, a vacuum head, means for effecting relative approach and separating movement of said chuck and vacuum head, and automatic control means operated prior to initiation of separating movement of said chuck and vacuum head to effect energization of said magnetic chuck and evacuation of said vacuum head, and operated during separating movement of said chuck and vacuum head to effect deenergization of said magnetic chuck and to terminate evacuation of said vacuum head.

10. The combination of claim 9, and means operable during separating movement of the chuck and vacuum head and subsequent to termination of the evacuation of said vacuum head to blow air into said vacuum head to loosen the mold from such head.

11. A mold extractor, comprising a mold form holding head, a mold gripping vacuum head, means for effecting relative approach and separating movement of said heads, and automatic control means operated prior to initiation of separating movement of said two heads to effect evacuation of said vacuum head, including means operable after very slight separating movement of said heads to terminate evacuation of said vacuum head.

12. A mold extractor, comprising a mold form holding head, a mold gripping vacuum head, means operable to effect relative approach movement of said heads, and to effect relative separating movement of said heads at a rapid rate, automatic control means operated prior to initiation of separating movement of said two heads to effect evacuation of said vacuum head, including evacuation control means operable after very slight separating movement of said heads to terminate evacuation of said vacuum head, and said first means being operable, prior to initiation of separation of said heads at a rapid rate, to effect relatively slow separating movement of the heads from initiation of separating movement at least until operation of said evacuation control means to terminate evacuation of said vacuum head.

13. A mold extractor, comprising a mold form holding head, a mold gripping vacuum head, means for effecting relative approach and separating movement of said heads, and automatic control means operated prior to initiation of separating movement of said two heads to effect evacuation of said vacuum head, and including a push button switch to terminate evacuation of the vacuum head, and switch engaging means engageable with said switch in closed position prior to initiation of separating movement of the heads, and movable to effect opening of said switch upon very slight separating movement of the heads, to terminate evacuation of the vacuum head.

14. A mold extractor, comprising a mold form holding head, a mold gripping vacuum head, means for effecting relative approach and separating movement of said heads, a guide member extending parallel to the course of movement of said heads, a block slidable along said guide member, a switch engaging member, one of said members being movable with one of said heads, a control circuit energizable to effect evacuation of said vacuum head and deenergizable to terminate evacuation of such head, a normally open push button switch in said control circuit engageable, in closed position, between said block and said switch engaging member, and thereafter operable to slide with said block along said guide member during the approach movement of said heads, and means to hold said block stationary with respect to said guide member upon initiation of separating movement of said heads, for relative recession of said switch engaging member from said push button switch to release it for breaking said control circuit.

15. A mold extractor, comprising a mold form holding head, a mold gripping vacuum head, means for effecting relative vertical approach and separating movement of said heads, a vertical guide rod, a block slidable along said guide rod, friction spring means operable to hold said block in any position on said rod against the force of gravity thereon, a control circuit energizable to effect evacuation of said vacuum head and deenergizable to terminate evacuation of such head, a normally open push button switch in said control circuit carried by said sliding block, a stop on said rod engageable with said switch to close it by downward movement of said block, and a switch engaging member movable with one of said heads and engageable with said push button switch in closed position, and thereafter operable to slide it in closed position with said block along said guide rod upward from said stop during the approach movement of said heads.

HENRY F. HAGEMEYER.